(12) United States Patent
Robinson

(10) Patent No.: US 8,164,827 B2
(45) Date of Patent: Apr. 24, 2012

(54) INFRARED WINDOW ASSEMBLY

(76) Inventor: Martin Robinson, Chelmsford (GB)

( * ) Notice: Subject to any disclaimer, the term of this patent is extended or adjusted under 35 U.S.C. 154(b) by 309 days.

(21) Appl. No.: 12/531,967

(22) PCT Filed: Mar. 19, 2008

(86) PCT No.: PCT/GB2008/050199
§ 371 (c)(1),
(2), (4) Date: Sep. 18, 2009

(87) PCT Pub. No.: WO2008/114057
PCT Pub. Date: Sep. 25, 2008

(65) Prior Publication Data
US 2010/0103509 A1    Apr. 29, 2010

(30) Foreign Application Priority Data
Mar. 20, 2007  (GB) .................................. 0705297.0

(51) Int. Cl.
*G02B 13/14*  (2006.01)
(52) U.S. Cl. ........................................................ 359/356
(58) Field of Classification Search .................... None
See application file for complete search history.

(56) References Cited

U.S. PATENT DOCUMENTS

| | | | | |
|---|---|---|---|---|
| 2,632,252 | A | * | 3/1953 | Blais, Sr. ....................... 359/511 |
| 5,481,400 | A | | 1/1996 | Borden |
| 5,493,126 | A | | 2/1996 | Taylor et al. |
| 5,776,612 | A | | 7/1998 | Fisher |
| 2002/0039236 | A1 | * | 4/2002 | Jones ............................ 359/601 |

FOREIGN PATENT DOCUMENTS

| | | |
|---|---|---|
| EP | 1 273 114 | 3/1970 |
| GB | 2 317 636 | 4/1998 |
| JP | 2001057642 | 2/2001 |
| WO | WO 99/23341 | 5/1999 |

OTHER PUBLICATIONS

English machine translation of JP 2001-057642.*
International Search Report for PCT Application No. PCT/GB2008/050199.
U.K. Search Report for British Patent Application No. GB0705297.0.

* cited by examiner

*Primary Examiner* — Derek S Chapel
(74) *Attorney, Agent, or Firm* — Renner Kenner Greive Bobak Taylor & Weber

(57) ABSTRACT

A lens assembly 10 for an infrared window through which infrared inspection of an apparatus within a housing is performed when the lens assembly is mounted in an aperture provided in the housing. The lens assembly includes an infrared transmitting pane 11 having two generally opposed surfaces 14; and a first protective grille 12 lying against one of the opposed surfaces 14 and having an array of holes 20 formed therethrough that permit infrared inspection of the apparatus through the pane. A second protective grille 12 may be provided on the opposite face and there can be alignment means 21, 32 to ensure correct alignment of each with respect to the other.

13 Claims, 3 Drawing Sheets

INFRARED WINDOW ASSEMBLY

The present invention relates to a lens assembly for an infrared window and more particularly to a lens assembly having at least one protective grille arranged to overlie a lens.

It is known to use infrared cameras to monitor electrical or other suitable installations. Such installations are usually located within a housing or housings so as to isolate the components from the ambient environment—both for their protection and for general safety considerations. Therefore to gain access to the equipment for the purpose of infrared inspections or temperature measurement the housing must be removable or ports, through which the components may be viewed must be provided. These infrared windows or ports must be provided with panes manufactured from material which permits the transmission of electromagnetic radiation in the infrared wavelength range. Such ports allow viewing of the contents and prevent the ingress of contaminants.

Unfortunately, the cost of the materials from which these panes (or crystals) are made is high, and if high standards are required the cost increases yet further. The high cost of the materials is largely attributed to their ability to allow infrared electromagnetic radiation to pass therethrough, but such materials often provide limited resistance to the adverse ambient conditions to which they are subjected. Such adverse conditions lead to the lens becoming damaged by impact or water ingress, often by matter airborne inside the housing and also equipment presented to the lens on the outside of the housing, particularly infrared/thermal imaging cameras and the like. Dirt and grease collects in the scratches which ultimately affects the accuracy of the infrared measurements and temperature calculations. Generally monitoring is carried out periodically, rather than constantly, and for the majority of the time the infrared windows or ports are acting as expensive contaminant excluders.

Current viewing panes are often made from calcium fluoride ($CaF_2$) which is water soluble and frangible. Infrared transmitting polymer is also used, but this also fragile, which is not suitable for the industrial environments in which it is often intended to be used.

The object of the present invention is to provide an infrared window lens assembly that includes means by which the pane is protected from damage so is less likely to become scratched or impaired. It is a further object of the present invention to provide an infrared window lens assembly which limits any damage that does still occur to localised regions of the pane leaving the rest still functional.

According to the invention, there is provided an infrared window lens assembly through which infrared inspection of apparatus within a housing is performed when the lens assembly is mounted in an aperture provided in the housing, the lens assembly comprising:

an infrared transmitting pane having two generally opposed surfaces; and a first protective grille lying against one of said opposed surfaces and having an array of holes formed therethrough that permit infrared inspection of the apparatus through the pane.

One of the opposed surfaces locates toward the interior of the housing and the other locates toward the exterior of the housing. The first grille may be provided on either of those opposed faces depending on the conditions inside and outside the housing, but usually will locate on the exterior side as this is often the most liable to damage. Preferably, a second grille, similar or substantially the same as the first grille, is provided on the other surface of the pane, so that the pane is equipped to resist adverse conditions that prevail in the interior and the exterior of the housing. Such conditions might include debris and moving equipment which may come into contact with the pane and pressure differential between the inside and outside environments.

In a preferred arrangement the holes are all of an equal size and shape, and more preferably each hole is a regular polygon in shape with sides of equal length. An array of holes of such a shape is uniform in appearance and in infrared transmissivity. The characteristics of the grilles, such as the shape of the holes, the dimensions of the holes, and the spacing between the holes, is very important in most applications because they are related to the strength of the assembly and the transmission of electromagnetic radiation therethrough. Thus, there is likely to be an optimum size hole and size spacing depending on the application of the infrared window lens assembly, since some applications may require extra strength and others extra transmission quality. However, to achieve the optimum strength and transmission, it is preferable for the holes to all be the same size and shape.

Most preferably the holes are a shape that tessellate, such that two adjacent holes are spaced apart by a narrow strip. This arrangement enables all strips between adjacent holes to have a uniform thickness which provides uniformity in strength and transmission over the entire array. The holes could be a combination of different shapes that tessellate, for example octagons and squares, or may be similar tessellating shapes such as hexagons, squares or triangles. Preferably the holes are all hexagonal because this provides a good balance between strength and transmission, regardless of the orientation of an infrared imaging camera.

Preferably the lens assembly is supported in a frame adapted to locate in an aperture formed in the housing; otherwise the assembly may be supported directly in the aperture. Preferably, alignment means are provided on the first and second grilles so that the holes of the first grille align with the holes of the second grille. This may take various forms, including a notch formed in identical places on the periphery of the first and second grilles that engage a protuberance provided on the housing or frame, if present. Alternatively, the first and second means could be provided with complementary formations arranged to ensure the holes align when the formations co-operate with one another.

Preferably, the pane is made of a material which enables electromagnetic radiation in the infrared range to pass therethrough. In one arrangement the pane is made from an infrared transmitting polymer which is not water soluble. In an alternative arrangement the material from which the pane is made is an infrared transmitting crystal such as $CaF_2$.

The grilles may be made from any one material or combination of materials that exhibit sufficient structural strength to provide sufficient mechanical protection and support to the pane. The framework of the or each grille may advantageously be made of aluminium or other non-ferrous metals, and more preferably this framework may be coated with plastics.

The present invention also provides an infrared window comprising a frame adapted to be mounted in or on an aperture in a housing, and a lens assembly as previously described. Such an infrared window may have a cover mounted on the frame to protect the lens assembly when not in use. There may be external and internal covers, the external cover being located on the exterior of the housing and the internal cover being located on the interior of the housing. Such external and internal covers may be coupled to one another and mounted on or adjacent the frame and arranged to move in unison between a closed position whereat the lens is substantially concealed and an open position whereat the lens is substantially visible.

In order that the present invention may be better understood but by way of example only, one particular embodiment will now be described in detail with reference to the accompanying drawings in which.

Figure 1:
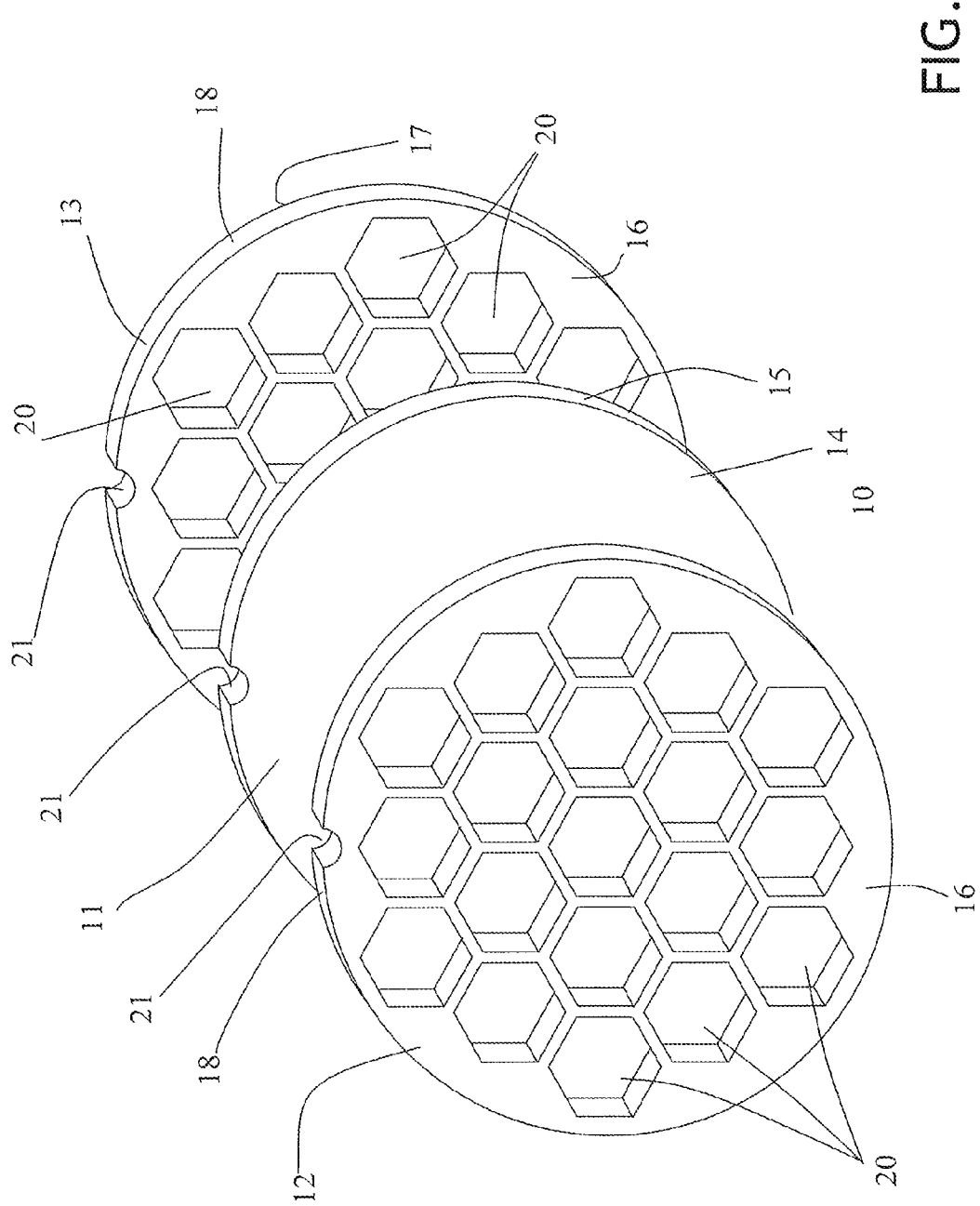
FIG. 1 is a perspective view of a lens assembly for an infrared window according to the present invention.
Figure 2:
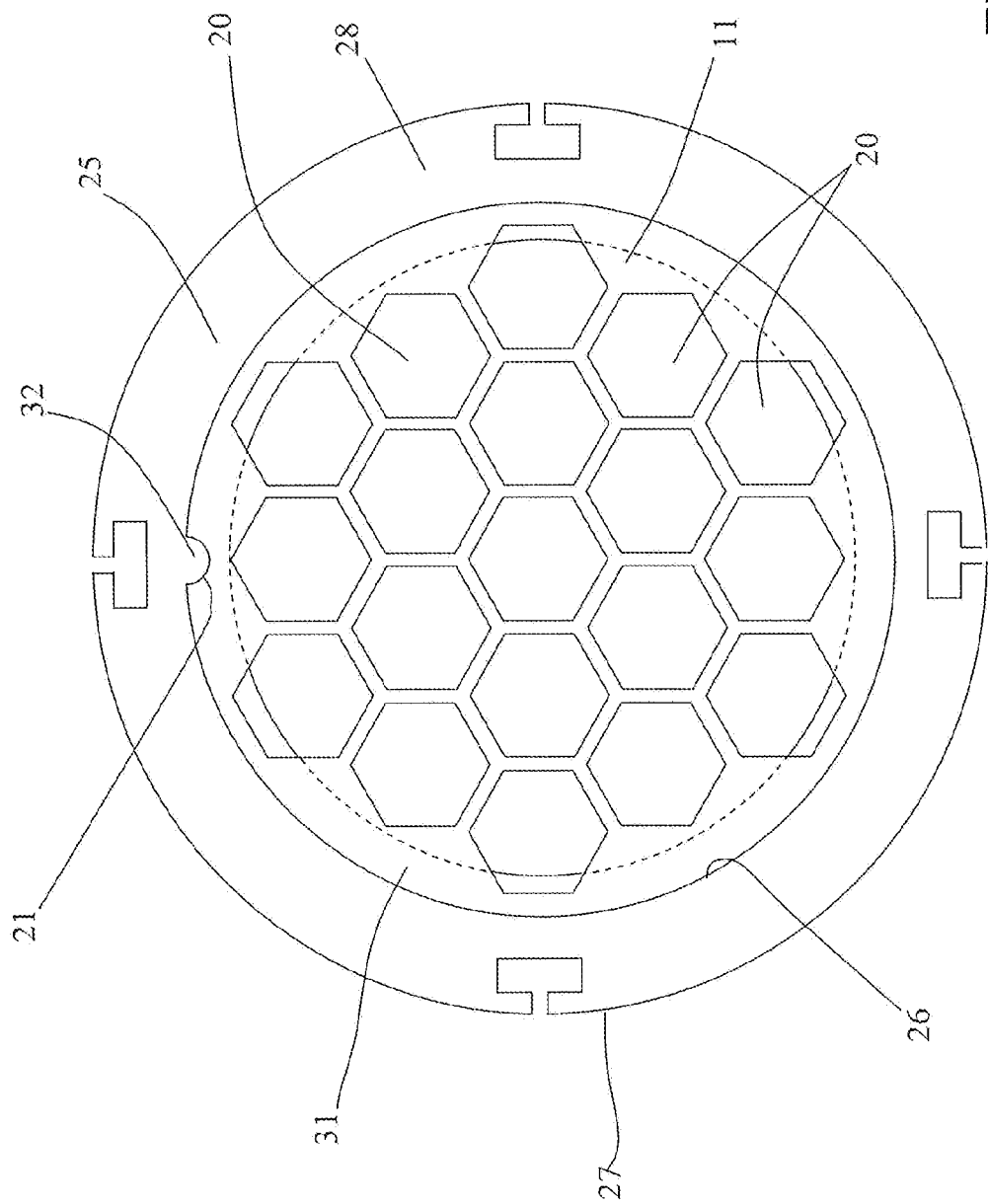
FIG. 2 is a front view of a frame supporting the infrared window lens assembly.
Figure 3:
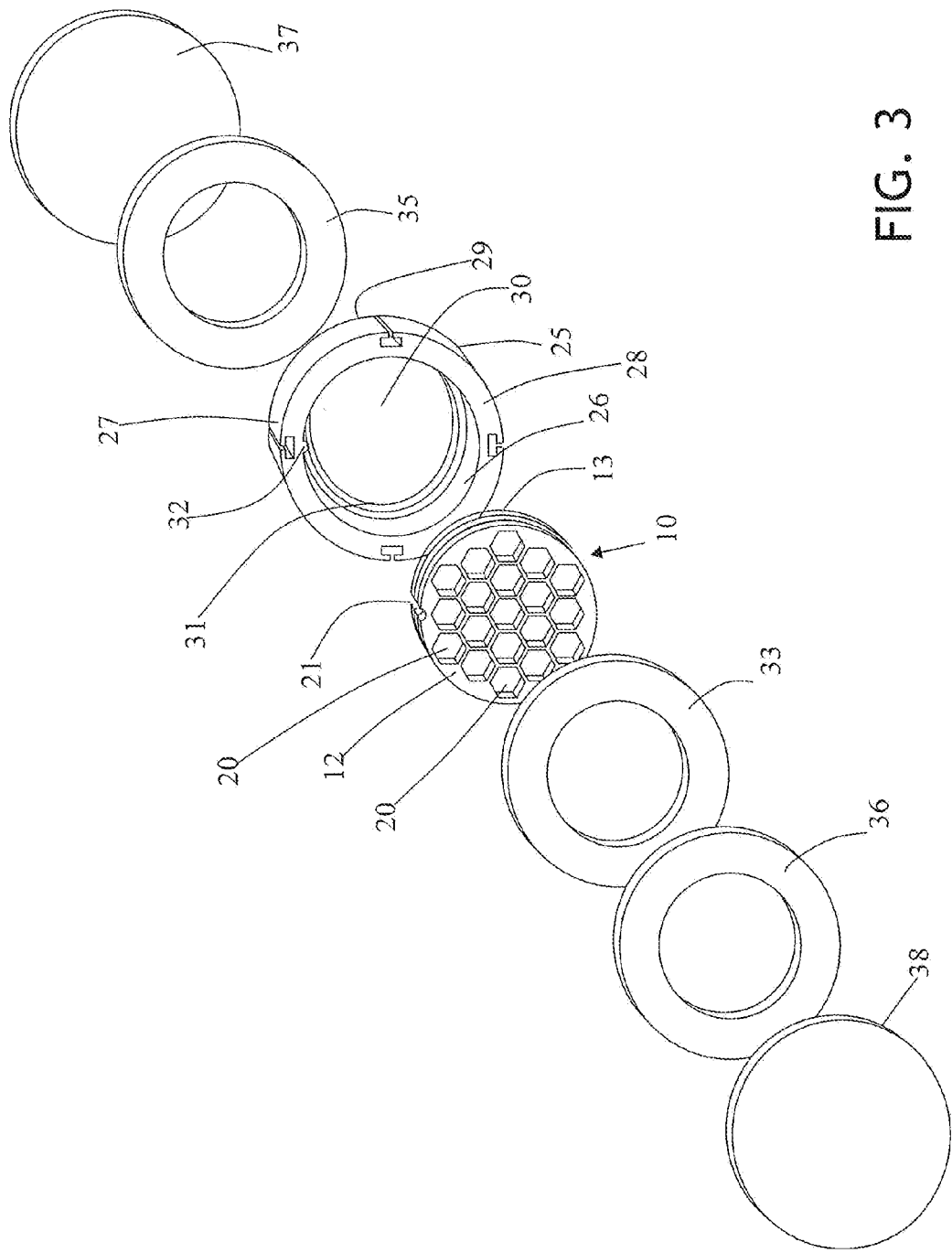
FIG. 3 is a perspective view of a whole infrared window, including the lens assembly of FIG. 1.

Referring to all of FIGS. 1 to 3, there is shown an infrared window lens assembly generally indicated 10, that comprise a pane 11 and first and second grilles 12, 13. The pane 11 is a circular disc having opposed front and rear planar faces 14 and a circumferential edge face 15. The pane 11 is made of polymeric or crystalline materials that permit the passage of electromagnetic radiation in the infrared range to pass therethrough. The first and second grilles 12, 13 are substantially the same as one another and comprise circular discs having opposed front and rear faces 16, 17 and a circumferential edge 18. An array of hexagonal holes 20 are formed axially through each of the first and second grilles 12, 13. All the holes 20 are substantially the same size, are spaced a uniform distance apart and arranged in a tessellation.

The first and second grilles 12, 13 are arranged to lie against the opposed planar faces 14 of the pane 11, thereby forming the lens assembly 10. A notch 21 is provided on the periphery of each of the first and second grilles 12, 13 and on the periphery of the pane 11. The two notches 21 on the first and second grilles 12, 13 are located in the same position relative to their respective arrays of hexagonal holes. This ensures that the holes of each grille align when assembled, as misalignment would increase visual obstruction to infrared inspection.

FIGS. 2 and 3 show the lens assembly as previously described assembled as a completed laminate structure and positioned in frames for support. These figures show a generally annular frame 25 having concentric internal and external circumferential faces 26, 27 and opposed inner and outer faces 28, 29. The internal circumferential face 26 defines an opening 30 in which the lens assembly 10 locates, the lens assembly 10 is arranged to bear against an annular flange 31 extending inwardly from said internal circumferential face 26. A small protuberance 32 extends radially inwards from the internal circumferential face 26 and axially from the annular flange 31, and is intended to engage the aligned notches 21 of the lens assembly 10. The inter-engagement of the protuberance 32 and notches 21 ensures that the lens assembly 10 cannot rotate relative to the frame 25 and that the first grille 12 and second grille 13 cannot rotate with respect to each other.

Referring now specifically to FIG. 3, there is shown an example of a possible infrared window assembly including the lens assembly 10, frame 25 and further components. A retention ring 33 is arranged to locate against the inner face 28 of said frame and hold the lens assembly in place. The frame 25, lens assembly 10 and retention ring 33 may locate in an aperture (not shown) formed in a housing (not shown) containing an article to be viewed. An external ring 35 is located on the exterior of the housing and is mounted to the outer face 29 of the frame 25. A similar internal ring 36 is located on the interior of the housing and mounted over the retention ring 33. The external ring 35, internal ring 36 and retention ring 33 are secured to the frame 25 by suitable means such as screws (not shown) or similar fasteners.

External and internal covers 37, 38 are mounted on the frame to protect the lens assembly when not in use. These covers 37 and 38 are coupled to one another and mounted on or adjacent the frame and arranged to move in unison between a closed position whereat the lens assembly is substantially concealed and an open position whereat the lens assembly is substantially visible.

The covers may remain in the plane of the frame when in both the open and closed positions, but they may also simultaneously move out of the plane in opposite directions as they open. Preferably, the covers are pivotally mounted on the frame and rotate in unison between the open and closed positions. The covers may be rotatably mounted to the frame by an axially extending pin (not shown) which locates in an opening (also not shown) formed coaxially through the frame. This will allow the covers to simultaneously rotate about the pin to open. The covers could be adapted to slide laterally together to cover or uncover the lens. Locking means may be provided on the fame to secure the covers in their closed configuration.

The invention claimed is:

1. An infrared window assembly mounted in an aperture provided in a housing containing an apparatus to be subjected to infrared inspection the assembly comprising:
   a frame mounted in the aperture in the housing;
   a viewing pane mounted in the frame and formed from an infrared transmitting material, the pane having two generally opposed surfaces; and
   a first protective grill lying against one of said opposed surfaces and providing mechanical protection and support to the pane, the grill having an array of holes formed therethrough that permit infrared inspection through the pane from the outside of the housing of the apparatus.

2. An infrared window assembly as claimed in claim 1, wherein a substantially similar second grill is provided on the other of the opposed faces.

3. An infrared window lens assembly as claimed in claim 2, wherein alignment means are provided on the first and second grills so that the holes of the first grill align with the holes of the second grill.

4. An infrared window assembly as claimed in any of the preceding claims claim 1, wherein the holes are of equal size and shape and are arranged in a regular array.

5. An infrared window lens assembly as claimed in claim 1, wherein each hole is polygonal with sides of equal length.

6. An infrared window lens assembly as claimed in claim 1, wherein the holes are all triangular, rectangular, or hexagonal.

7. An infrared window lens assembly as claimed in claim 1, wherein the holes are arranged in a tessellation.

8. An infrared window lens assembly as claimed in claim 1, wherein the pane is made of a polymer through which electromagnetic radiation in the infrared range may be transmitted.

9. An infrared window lens assembly as claimed in claim 1, wherein the pane is made of a crystal material through which electromagnetic radiation in the infrared range may be transmitted.

10. An infrared window lens assembly as claimed in claim 1, wherein the grill is made of aluminum and coated with plastics.

11. An infrared window assembly as claimed in claim 1, which is adapted to be releasably mounted in the frame.

12. An infrared window as claimed in claim 1, wherein there is further provided a cover mounted on the frame to protect the assembly when not in use.

13. An infrared window as claimed in claim 12, wherein there are external and internal covers, the external cover being located on the exterior of the housing and the internal cover being located on the interior of the housing; and where the covers are coupled to one another and mounted on or adjacent the frame and arranged to move in unison between a closed position whereat the pane is substantially concealed and an open position whereat the pane is substantially visible.

\* \* \* \* \*

UNITED STATES PATENT AND TRADEMARK OFFICE
CERTIFICATE OF CORRECTION

PATENT NO.       : 8,164,827 B2
APPLICATION NO.  : 12/531967
DATED            : April 24, 2012
INVENTOR(S)      : Martin Robinson It is certified that error appears in the above-identified patent and that said Letters Patent is hereby corrected as shown below:

In the Claims

In claim 4, the phrase "as claimed in any of the preceding claims claim 1" should read -- as claimed in claim 1 --.

Signed and Sealed this
Twenty-eighth Day of May, 2013

Teresa Stanek Rea
*Acting Director of the United States Patent and Trademark Office*

UNITED STATES PATENT AND TRADEMARK OFFICE
CERTIFICATE OF CORRECTION

PATENT NO.         : 8,164,827 B2                                          Page 1 of 1
APPLICATION NO.    : 12/531967
DATED              : April 24, 2012
INVENTOR(S)        : Martin Robinson It is certified that error appears in the above-identified patent and that said Letters Patent is hereby corrected as shown below:

In the Claims

In claim 4, Column 4, lines 41-42, the phrase "as claimed in any of the preceding claims claim 1" should read -- as claimed in claim 1 --.

This certificate supersedes the Certificate of Correction issued May 28, 2013.

Signed and Sealed this
Eighteenth Day of June, 2013

Teresa Stanek Rea
*Acting Director of the United States Patent and Trademark Office*